C. H. PALMER.
SPRING SEAT.
APPLICATION FILED SEPT. 1, 1916.
1,233,499.
Patented July 17, 1917.
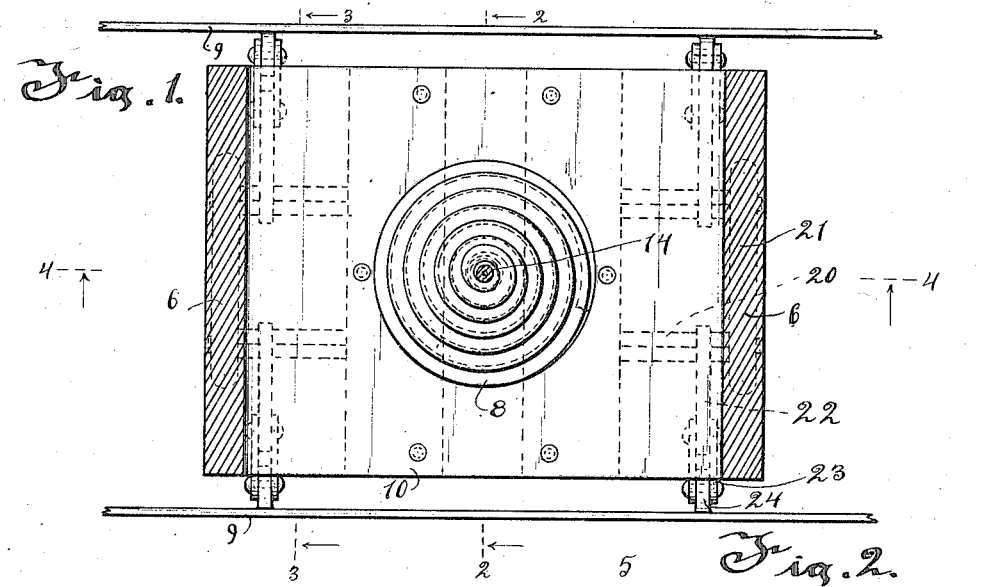
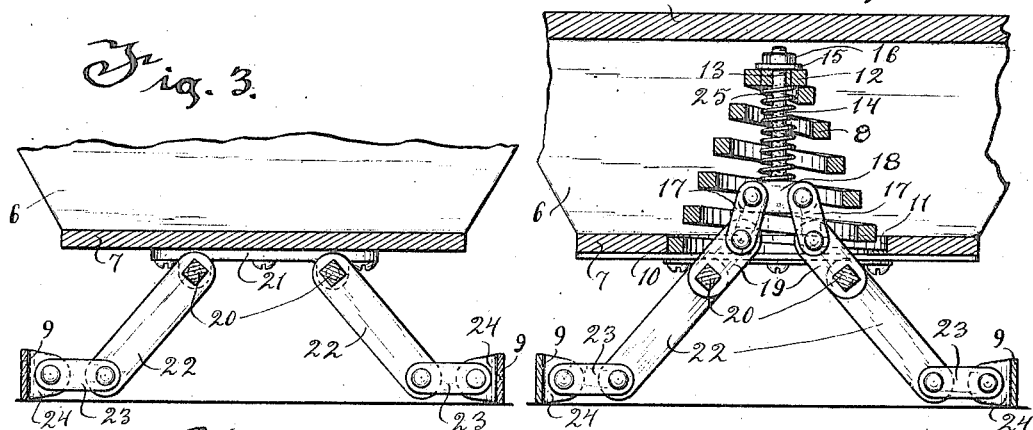
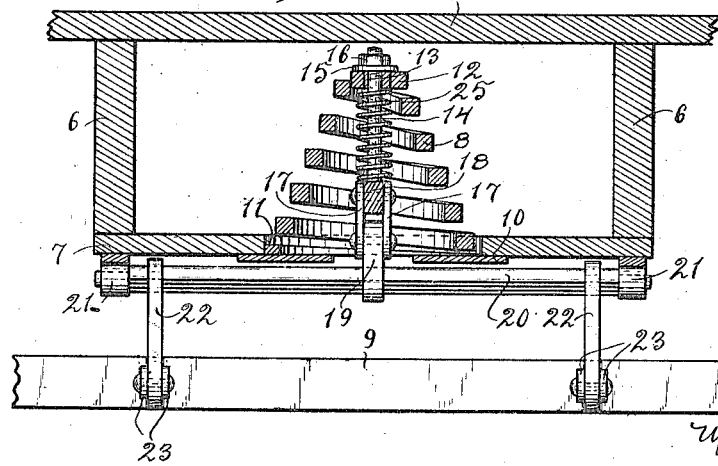
INVENTOR
Charles H. Palmer
Morsell, Keeney & French.
ATTORNEYS

UNITED STATES PATENT OFFICE.

CHARLES H. PALMER, OF MILWAUKEE, WISCONSIN.

SPRING-SEAT.

1,233,499.  Specification of Letters Patent.  Patented July 17, 1917.

Application filed September 1, 1916. Serial No. 117,975.

*To all whom it may concern:*

Be it known that I, CHARLES H. PALMER, a citizen of the United States, and resident of Milwaukee, Wisconsin, in the county of Milwaukee and State of Wisconsin, have invented new and useful Improvements in Spring-Seats, of which the following is a description, reference being had to the accompanying drawings, which are a part of this specification.

The invention relates to spring seats.

The invention is more particularly designed to provide a spring seat in which provision is made for preventing breakage of the supporting spring as hereinafter described.

The invention further consists in the several features hereinafter set forth and more particularly defined by claims at the conclusion.

In the drawings:

Figure 1 is a plan view of the device embodying the invention, parts being shown in section;

Fig. 2 is a section taken on the line 2—2 of Fig. 1;

Fig. 3 is a section taken on the line 3—3 of Fig. 1;

Fig. 4 is a section taken on the line 4—4 of Fig. 1.

The numeral 5 represents the top of the seat which rests on side frame members 6 to which a bottom 7 is secured to form a box seat.

This seat is resiliently supported on a conical coil spring 8 through linkage connected to the supporting frame members 9 which are secured to the automobile or other vehicle upon which the seat is used. The spring 8 is disposed within the hollow of the seat and is secured at its lower enlarged end to an apertured base plate 10 secured to the bottom 7, there being an aperture 11 in said bottom through which the spring passes. The top end 12 of the spring is flattened out and provided with an aperture 13 to loosely mount it on the upper threaded end of a vertically disposed bolt 14, said bolt also having a washer 15 and nut 16 mounted on said upper end. This bolt 14 is operatively connected with the supporting frame members 9 by linkage in each instance comprising a pair of links 17 pivotally mounted on the head 18 of the bolt 14 and pivotally connected to a crank 19 secured to a shaft 20 mounted in bearings 21 on the bottom 7, cranks 22 mounted on said shaft 20 and pivotally secured to a pair of links 23 which are pivotally secured to lugs 24 on the frame member 9.

With this construction when the seat is under load the linkage previously described will cause the cranks 19 to move downwardly with the links 17 thus moving the bolt 14 and compressing the spring 8 between the washer and nut of the bolt and the base plate 10. On the release of the load the spring and bolt return to their former position but when the spring, as is frequently the case is suddenly relieved of its load it springs back beyond its normal position and the bolt 14 either strikes the top of the seat or the spring breaks under undue strain. To obviate these difficulties it is the essential object of this invention to provide a snubber for the spring to absorb any shock to which it may be subjected.

This shock absorbing means is simple but has been found to be efficient in practice and consists of a coil spring 25 surrounding the bolt 14 and interposed between the bolt head 18 and the block 13. When the load is applied the spring 8 is compressed as previously described and the spring 25 does not interfere with such action. When however the load is released the spring 25 prevents movement between the spring 8 and the bolt 14 by resiliently resisting any tendency of the upper end of the spring 8 to move away from the washer 15 and thus prevents any strain upon the spring 8 due to a sudden release of the load.

The spring 25 is put in between the block 18 and the spring 13 under compression and then it becomes an extensible spring to prevent the post or bolt 14 from going up beyond the point of recoil of the spring 8. This it does by keeping the upper end of the spring 8 in position on the upper end of the post and if it were not present the exhaustion of the spring 8 on the recoil would not exhaust the throw of the seat and bolt 14. In brief the spring 25 serves to maintain the movements of the linkage and the seat in proper relation with each other and thus avoids any possible breaking of the spring 8 and uncomfortable jarring to the occupant.

What I claim as my invention is:

1. The combination, with supporting means, of a coiled spring, linkage connecting said spring with said supporting means to permit compression of said spring when a load is imposed upon it, a seat resiliently supported by said spring, and means including a spring for relieving the shock on the supporting spring when the load is released.

2. The combination, with supporting means, of a base plate, a vertically disposed member, a supporting spring interposed between said base plate and the upper end of said member with the supporting means to permit compression of said spring when a load is imposed upon it, a spring mounted on said vertically disposed member and bearing upon the upper portion of said supporting spring to relieve said supporting spring of shock when it is relieved of the load, and a seat mounted upon the base plate and resiliently supported by said supporting spring.

3. The combination, with supporting means, of a base plate, a vertically disposed member having headed ends, a coiled supporting spring interposed between said base plate and the upper headed end of said member, linkage connecting said vertical member with said supporting means to permit compression of said spring when under load, a spring mounted on said vertical member and interposed between the lower headed end of said member and the upper end of the spring to relieve said supporting spring of shock, and a seat mounted upon the base plate and resiliently supported upon the supporting spring.

In testimony whereof, I affix my signature.

CHARLES H. PALMER.

Copies of this patent may be obtained for five cents each, by addressing the "Commissioner of Patents, Washington, D. C."